United States Patent
Gretz

(10) Patent No.: US 9,831,649 B1
(45) Date of Patent: Nov. 28, 2017

(54) RAIN TIGHT FITTING FOR ELECTRICAL METAL TUBING

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 0 days.

(21) Appl. No.: 15/405,759

(22) Filed: Jan. 13, 2017

Related U.S. Application Data

(60) Provisional application No. 62/417,604, filed on Nov. 4, 2016, provisional application No. 62/287,122, filed on Jan. 26, 2016.

(51) Int. Cl.
  *H02G 3/00* (2006.01)
  *H02G 3/08* (2006.01)
  *H02G 3/06* (2006.01)

(52) U.S. Cl.
  CPC ........... *H02G 3/088* (2013.01); *H02G 3/0683* (2013.01)

(58) Field of Classification Search
  CPC .... B60R 16/0222; H01B 17/26; H01B 17/30; H01B 17/583; H02G 3/083; H02G 3/22; H02G 3/99; H02G 3/0683
  See application file for complete search history.

(56) References Cited

U.S. PATENT DOCUMENTS

| | | | |
|---|---|---|---|
| 3,972,547 A * | 8/1976 | Itoya | F16L 41/10 285/136.1 |
| 5,072,072 A | 12/1991 | Bawa et al. | |
| 6,133,529 A * | 10/2000 | Gretz | F16L 37/008 16/2.1 |
| 6,670,553 B1 | 12/2003 | Gretz | |
| 6,765,143 B2 | 7/2004 | Kiely | |
| 6,988,746 B2 | 1/2006 | Olson | |
| 7,080,859 B1 * | 7/2006 | Gretz | F16L 19/10 285/151.1 |
| 7,374,212 B1 | 5/2008 | Gretz | |
| 7,390,027 B2 * | 6/2008 | Kiely | F16L 19/061 174/652 |
| 7,438,327 B2 * | 10/2008 | Auray | F16L 19/063 285/149.1 |
| 7,841,630 B1 | 11/2010 | Auray et al. | |
| 7,976,070 B2 | 7/2011 | Kiely | |
| 8,474,877 B2 | 7/2013 | Smith | |
| 8,708,374 B1 * | 4/2014 | Smith | H02G 3/0683 285/150.1 |

(Continued)

*Primary Examiner* — Pete Lee

(57) ABSTRACT

A rain-tight fitting for connecting electrical metal tubing to an electrical box in a rain-tight fit. The rain-tight fitting includes a fitting body having a leading end adapted to connect to the knockout of an electrical box and a trailing end adapted to create a rain-tight fit with an end of electrical metal tubing (EMT). One or more sleeves are seated within a trailing bore of the fitting body and are held in place by a fastener. A necked-down wall portion on the sleeve contacts the outer periphery of the EMT as it is inserted into the trailing end of the fitting. After the EMT is fully inserted within the trailing end of the fitting, the fastener is tightened to drive the fastener against the outer periphery of the EMT, thereby providing a grounding path between the fitting, the electrical box, and the EMT.

12 Claims, 16 Drawing Sheets

(56) References Cited

U.S. PATENT DOCUMENTS

| | | |
|---|---|---|
| 9,252,577 B1 | 2/2016 | Smith |
| 9,341,292 B2 | 5/2016 | Smith et al. |
| 9,350,154 B2 * | 5/2016 | Dinh |
| 9,385,520 B1 | 7/2016 | Gretz |
| 9,490,619 B2 | 11/2016 | Smith |
| 2005/0194785 A1 | 9/2005 | Shemtov |
| 2008/0149388 A1 * | 6/2008 | Kiely ........................ F16L 5/00 174/659 |

* cited by examiner

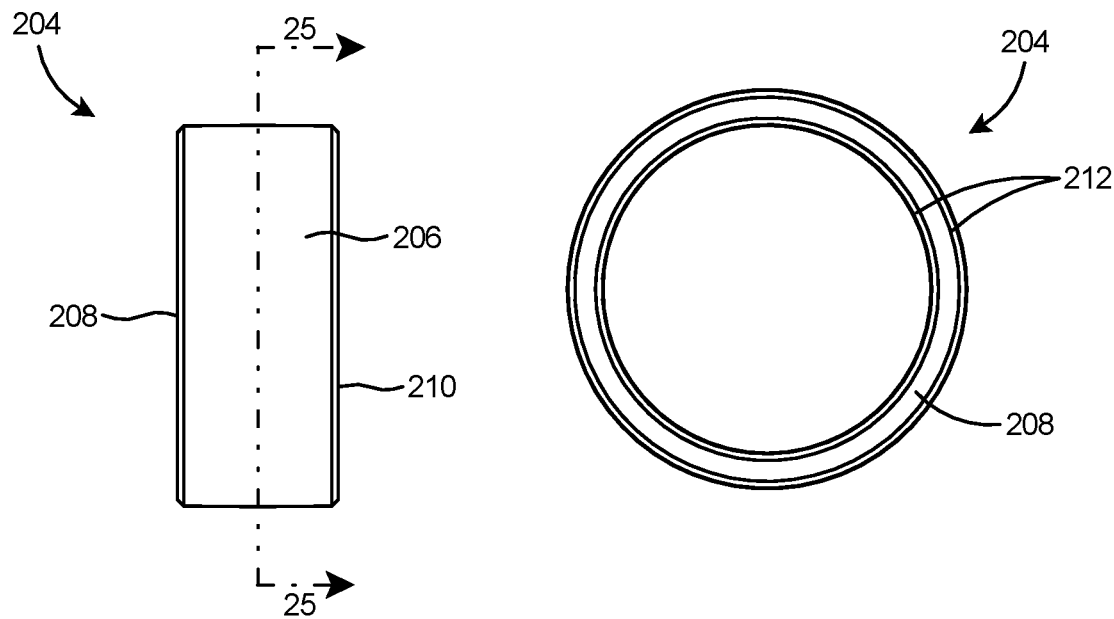
Fig. 23
Fig. 24
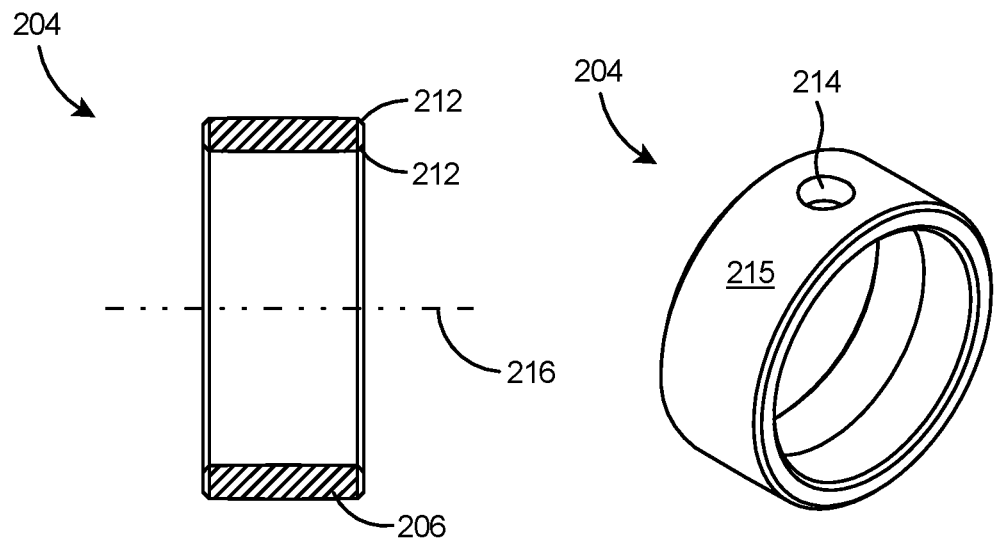
Fig. 25
Fig. 26

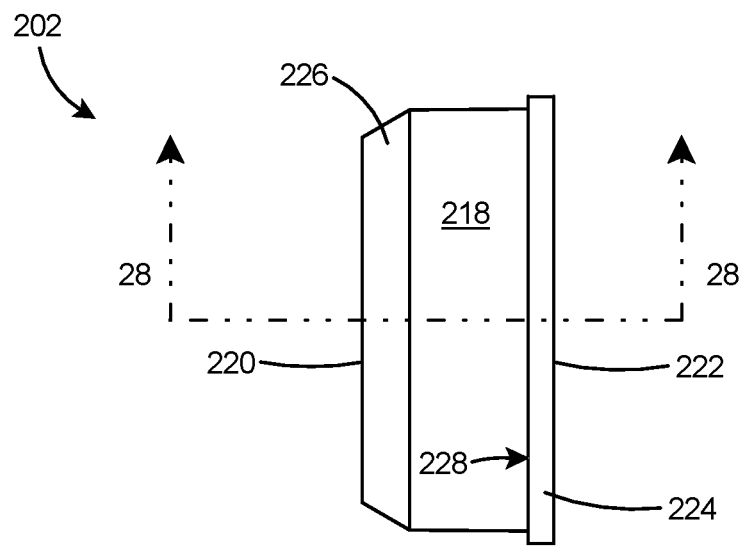
Fig. 27
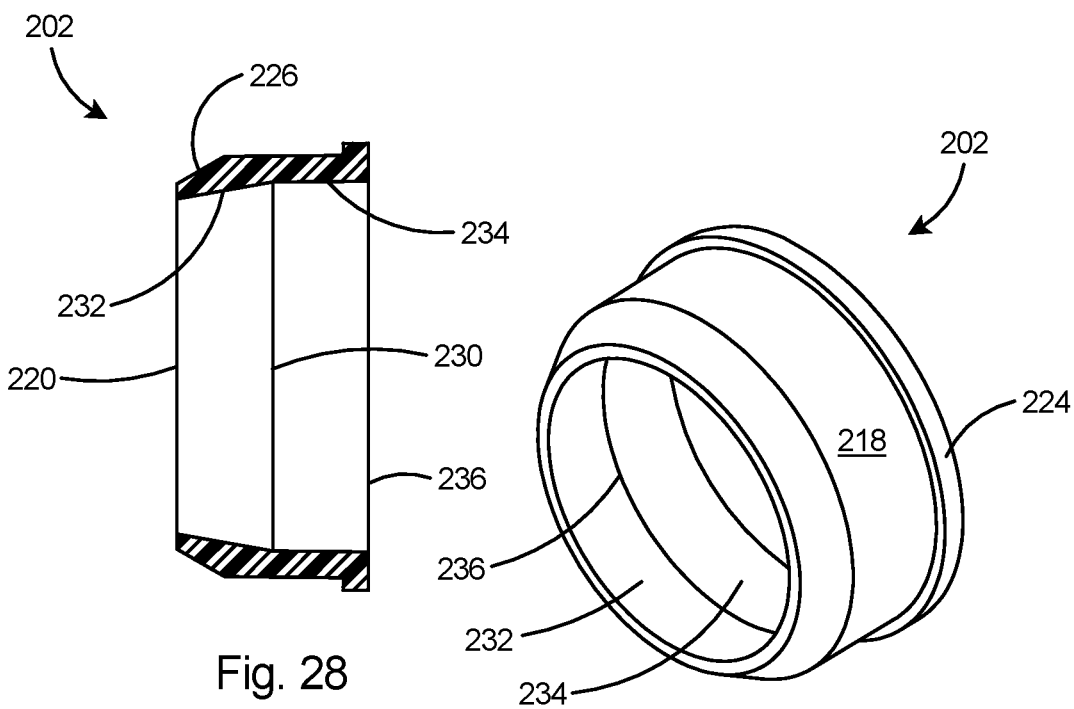
Fig. 28
Fig. 29

RAIN TIGHT FITTING FOR ELECTRICAL METAL TUBING

This application claims priority to provisional U.S. Application No. 62/417,604, filed Nov. 4, 2016, and claims priority to provisional U.S. Application No. 62/287,122, filed Jan. 26, 2016, the contents of which are herein incorporated by reference in their entirety.

FIELD OF THE INVENTION

This invention relates to connection of electrical tubing to an electrical box and more specifically to an electrical fitting for connection of electrical metal tubing (EMT) to an electrical box.

BACKGROUND

In the wiring of residential or commercial structures, electrical conduit may be used to protect and route electrical wiring in the interior or on the exterior of the structures. Electrical conduit may be rigid or flexible. Rigid metallic conduit (RMC) may be constructed of galvanized steel tubing, with a tubing wall thickness that is thick enough to allow it to be threaded. It is typically used in commercial and industrial construction. An alternative to RMC is electrical metallic tubing (EMT), which is typically constructed of steel, has a thinner wall than RMC, is not threaded, and is commonly used instead of RMC as it is less costly and lighter than RMC.

Electrical fittings are typically used to connect an end of EMT to an electrical box. Varying numbers, sizes, and types of conductors can then be pulled through the EMT to provide power to the connected electrical box and any equipment connected to the box. Although EMT provides very good protection to enclosed conductors from moisture, it is critical in some applications, such as outdoor electrical boxes or panels, to provide a rain-tight connection of the EMT to the box in order to prevent moisture and rain from entering the electrical box.

Accordingly, what is needed is an electrical fitting and method that enables securing electrical metal tubing to an electrical box in a rain-tight fit.

BRIEF SUMMARY OF THE INVENTION

The current invention is a rain-tight fitting for connecting electrical metal tubing to an electrical box. The rain-tight fitting includes a fitting body having a leading end adapted to connect to the knockout of an electrical box and a trailing end adapted to create a rain-tight fit with an end of electrical metal tubing (EMT). One or more sleeves are seated within a trailing bore of the fitting body and are held in place by a fastener. A necked-down wall portion on the sleeve contacts the outer periphery of the EMT as it is inserted into the trailing end of the fitting. After the EMT is fully inserted within the trailing end of the fitting, the fastener is tightened to drive the fastener against the outer periphery of the EMT, thereby providing a grounding path between the fitting, the electrical box, and the EMT. The installed fitting at the leading end and trailing end effects a rain-tight fit between the fitting, the electrical box, and the EMT.

Objects and Advantages

A first object of the current invention is to provide an electrical fitting that provides rain-tight connection of electrical metal tubing (EMT) to an electrical box or panel.

A second object of the invention is to provide an electrical fitting that establishes a grounding path between electrical metal tubing (EMT) and an electrical box or panel.

A further object of the invention is to provide an electrical fitting that establishes a rain-tight fit between the fitting at the leading end and trailing end, the electrical box, and an inserted end of electrical metal tubing.

BRIEF DESCRIPTION OF THE SEVERAL VIEWS OF THE DRAWING(S)

Reference is made herein to the accompanying drawings, which are not necessarily drawn to scale, and wherein:

FIG. 21 is an exploded isometric view of a second embodiment of the rain tight fitting assembly including the sleeve of FIG. 20.

FIG. 23 is a side view of an outer sleeve that forms a portion of the rain tight fitting of FIG. 22.

FIG. 24 is an end view of the outer sleeve.

FIG. 25 is a sectional view of the outer sleeve taken along line 25-25 of FIG. 22.

FIG. 26 is an isometric view of the outer sleeve.

FIG. 27 is a side view of an inner sleeve that forms a portion of the rain tight fitting of FIG. 22.

FIG. 28 is a sectional view of the inner sleeve taken along line 28-28 of FIG. 27.

FIG. 29 is an isometric view of the inner sleeve.

DETAILED DESCRIPTION

Figure 1:
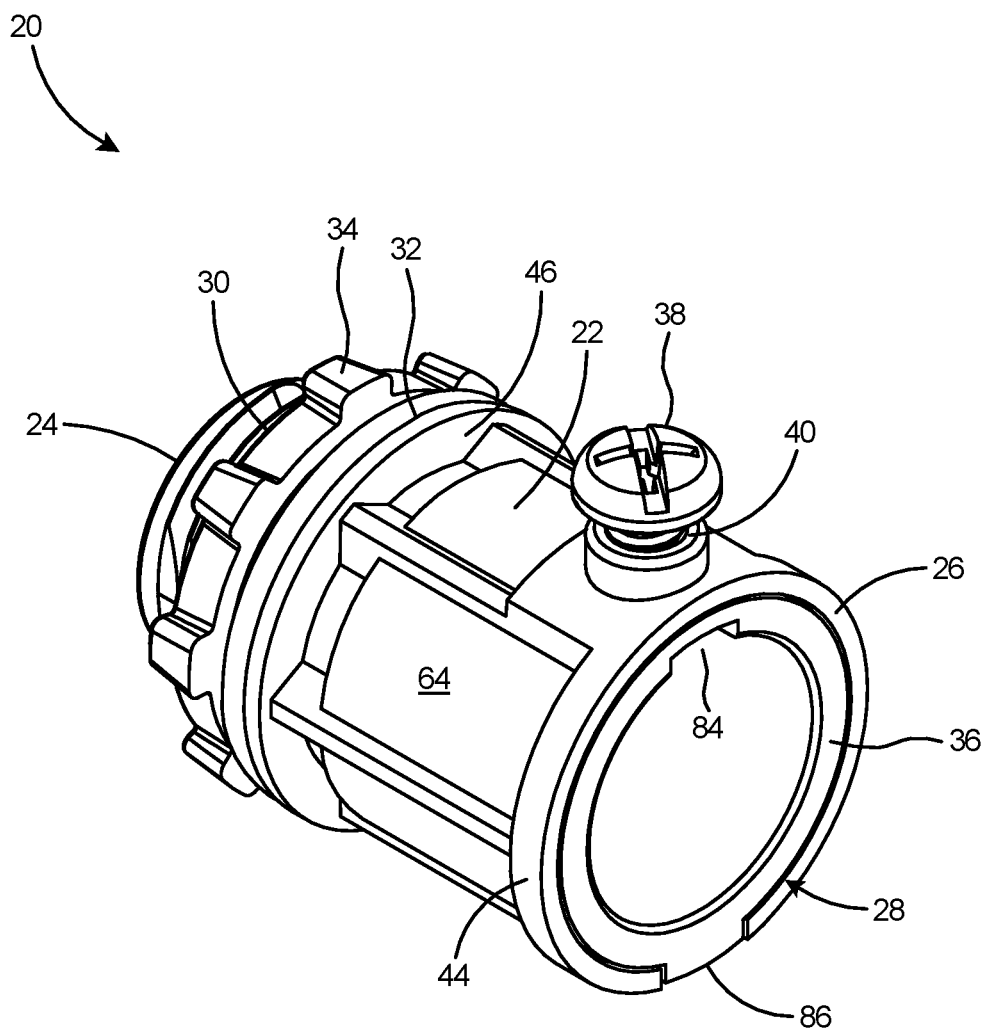
FIG. 1 is an isometric view, as viewed from the trailing end, of a rain tight fitting for electrical metal tubing (EMT) in accordance with embodiments of the invention.

With reference to FIG. 1, the present invention is a rain tight fitting for electrical metal tubing 20. The rain tight fitting 20 includes a tubular fitting body 22 with a leading end 24, a trailing end 26 with a trailing bore 28 therein, and a nose portion 30 at the leading end 24. A washer 32 and a locknut 34 are included on the nose portion 30. A sleeve 36 is fitted within the trailing bore 28 of the fitting body 22 and a fastener 38 is engaged within a bore 40 at the trailing end 26 of the fitting body. The bore 40 at trailing end 26 extends through the tubular wall 64 defining the trailing bore 28, the bore 40 being substantially at a right angle with respect to the central axis 41 of the fitting.

Figure 2:
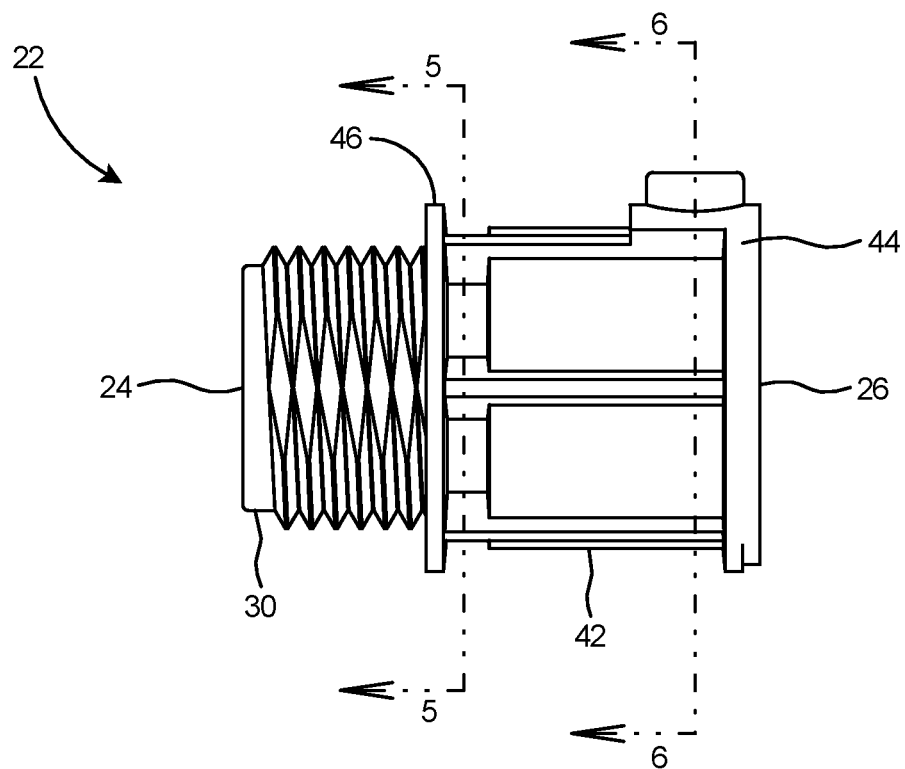
FIG. 2 is a side view of a fitting body that forms a portion of the rain tight fitting of FIG. 1.
Figure 3:
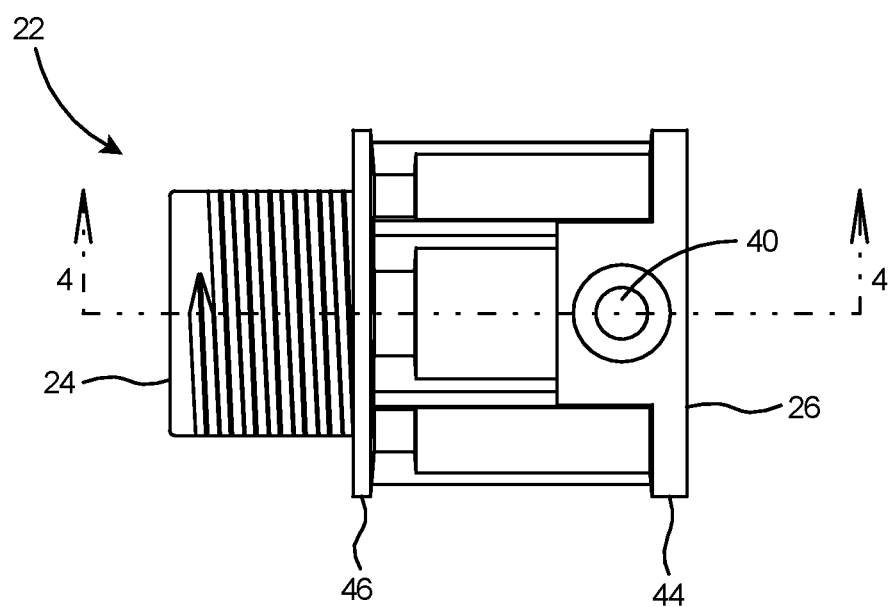
FIG. 3 is a top view of the fitting body.

Referring to FIGS. 2 and 3, the fitting body 22 includes a main body portion 42 including an end flange 44 at the trailing end 26 and a mid-body flange 46 between the main body portion 42 and the nose 30.

Figure 4:
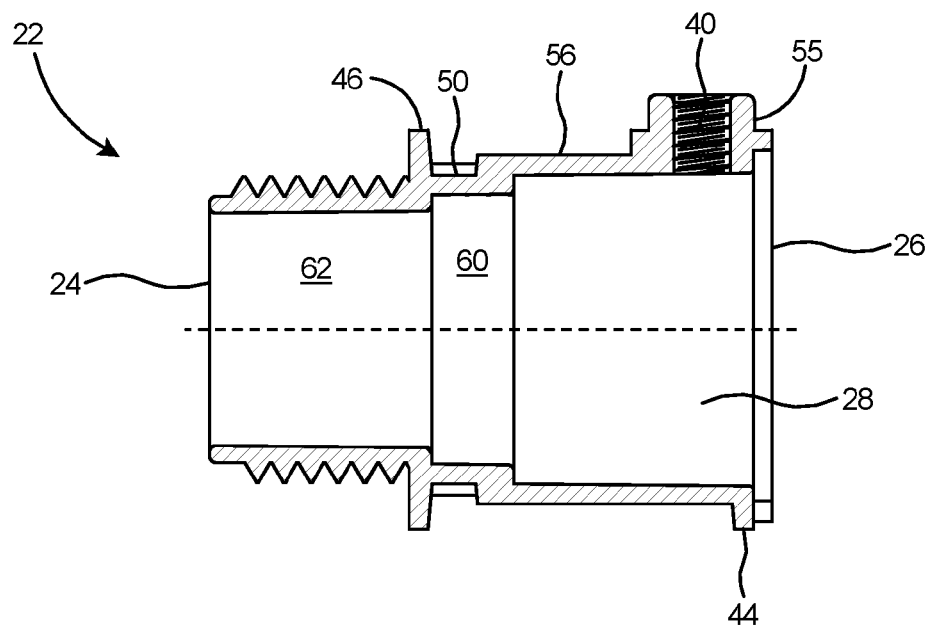
FIG. 4 is a sectional view of the fitting body taken along line 4-4 of FIG. 3.
Figure 5:
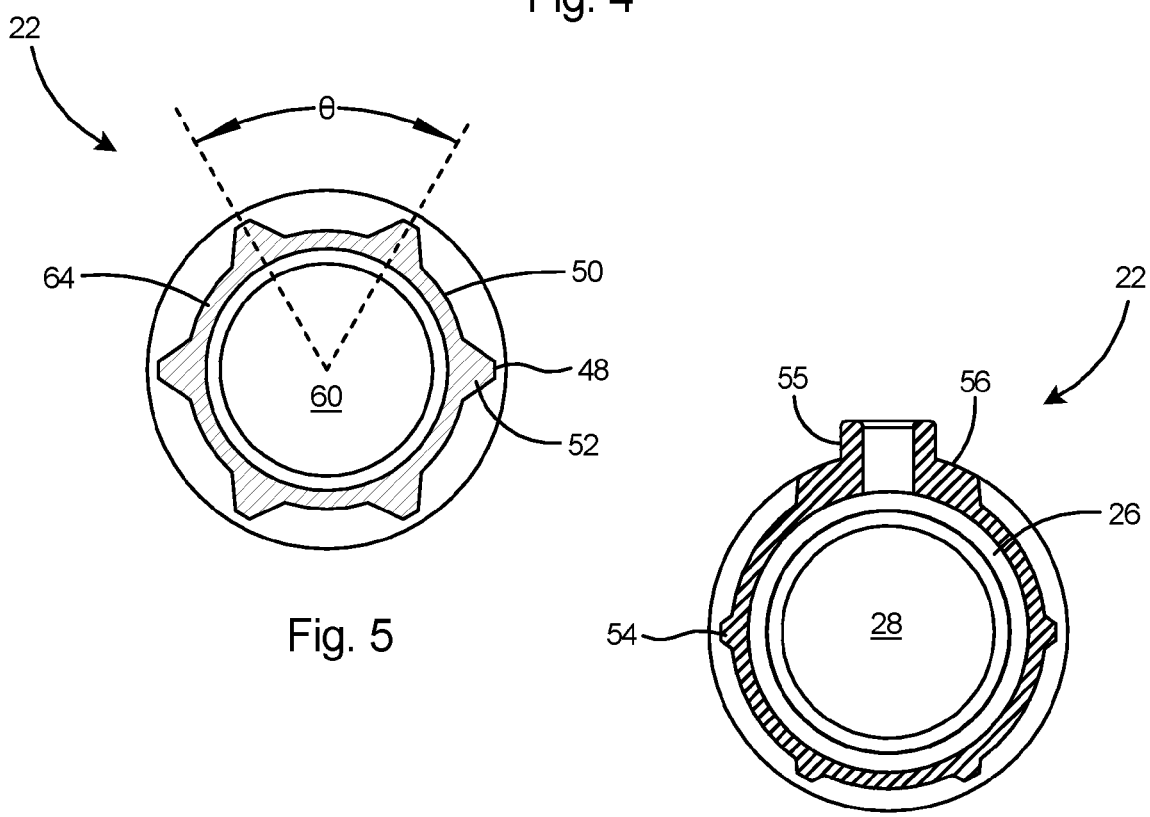
FIG. 5 is a sectional view of the fitting body taken along line 5-5 of FIG. 2.
Figure 6:
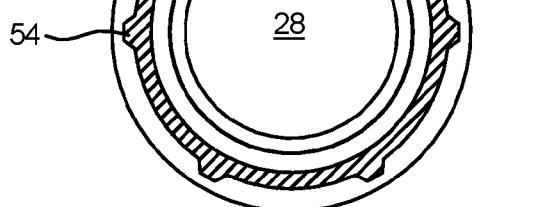
FIG. 6 is a sectional view of the fitting body taken along line 6-6 of FIG. 2.
Figure 7:
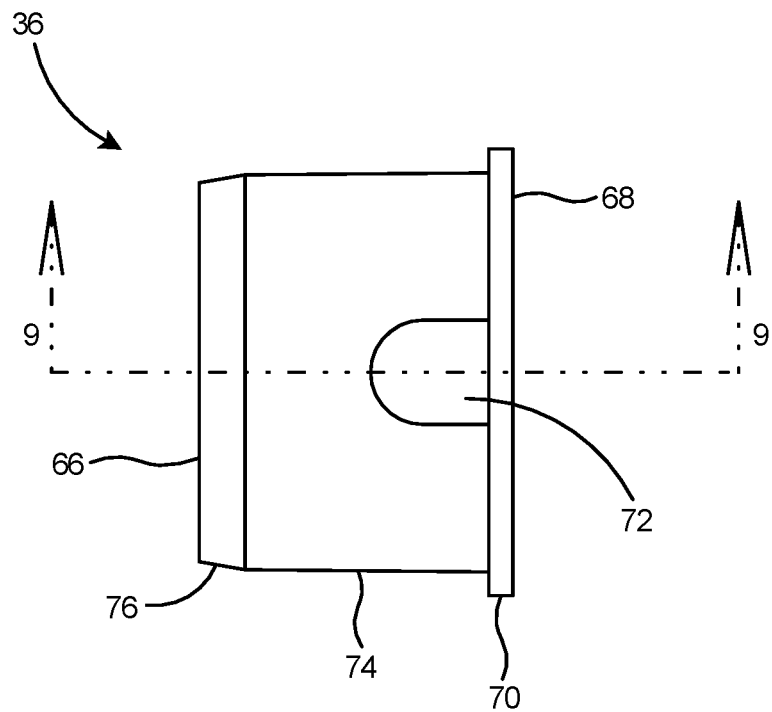
FIG. 7 is a top view of a sleeve that forms a portion of the rain tight fitting of FIG. 1.

With reference to FIGS. 4-6 one or more ribs 48 extending longitudinally along the fitting body 22 and extend substantially from the mid-body flange 46 to the end flange 44. Adjacent the mid-body flange 46 is a trough portion 50 (see FIG. 4), that is narrower than the main body portion 42 at the trailing end 26. The ribs 48 include wider rib sections 52 at the trough 50 (see FIG. 5) and narrower rib sections 54 at the trailing end 26 (see FIG. 6). A boss 55 extends outward from a raised area 56 of the fitting body 22 at the trailing end 26 and includes the bore 40 therein. The bore 40 is threaded to accept engagement by fastener 38. In addition to the trailing bore 28, the fitting body 22 includes a mid-body bore 60, and a leading bore 62. The fitting body 22 further includes a tubular wall 64 as shown in FIG. 5. As shown in FIG. 5, the ribs 48 are preferably spaced at an angle θ around the outer periphery of the tubular fitting body 22. Most preferably, the spacing angle θ of the ribs 48 around the fitting body is 60 degrees.

Figure 8:
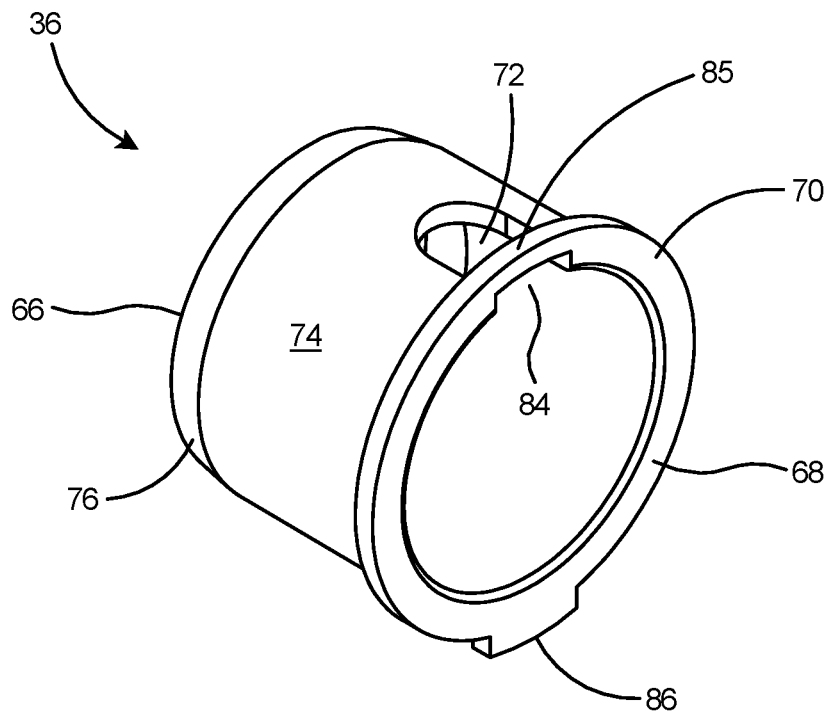
FIG. 8 is an isometric view of the sleeve.
Figure 9:
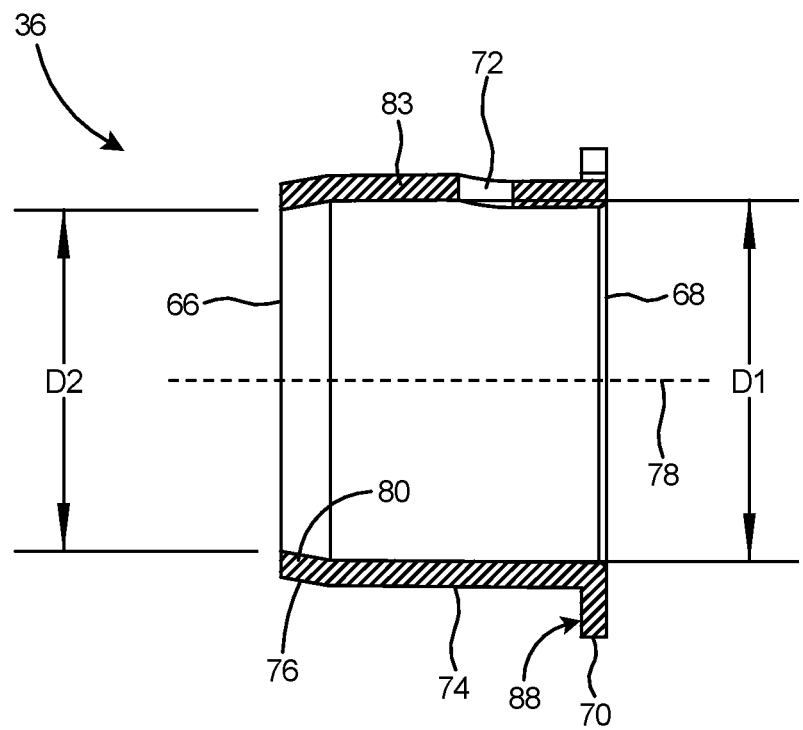
FIG. 9 is a sectional view of the sleeve taken along line 9-9 of FIG. 7.
Figure 10:
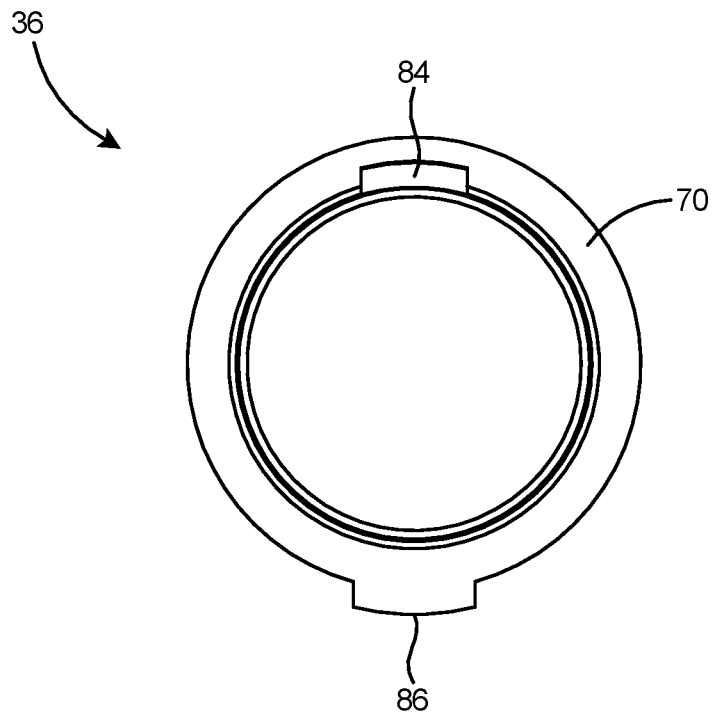
FIG. 10 is an end view of the sleeve as viewed from the right side of FIG. 7.
Figure 11:
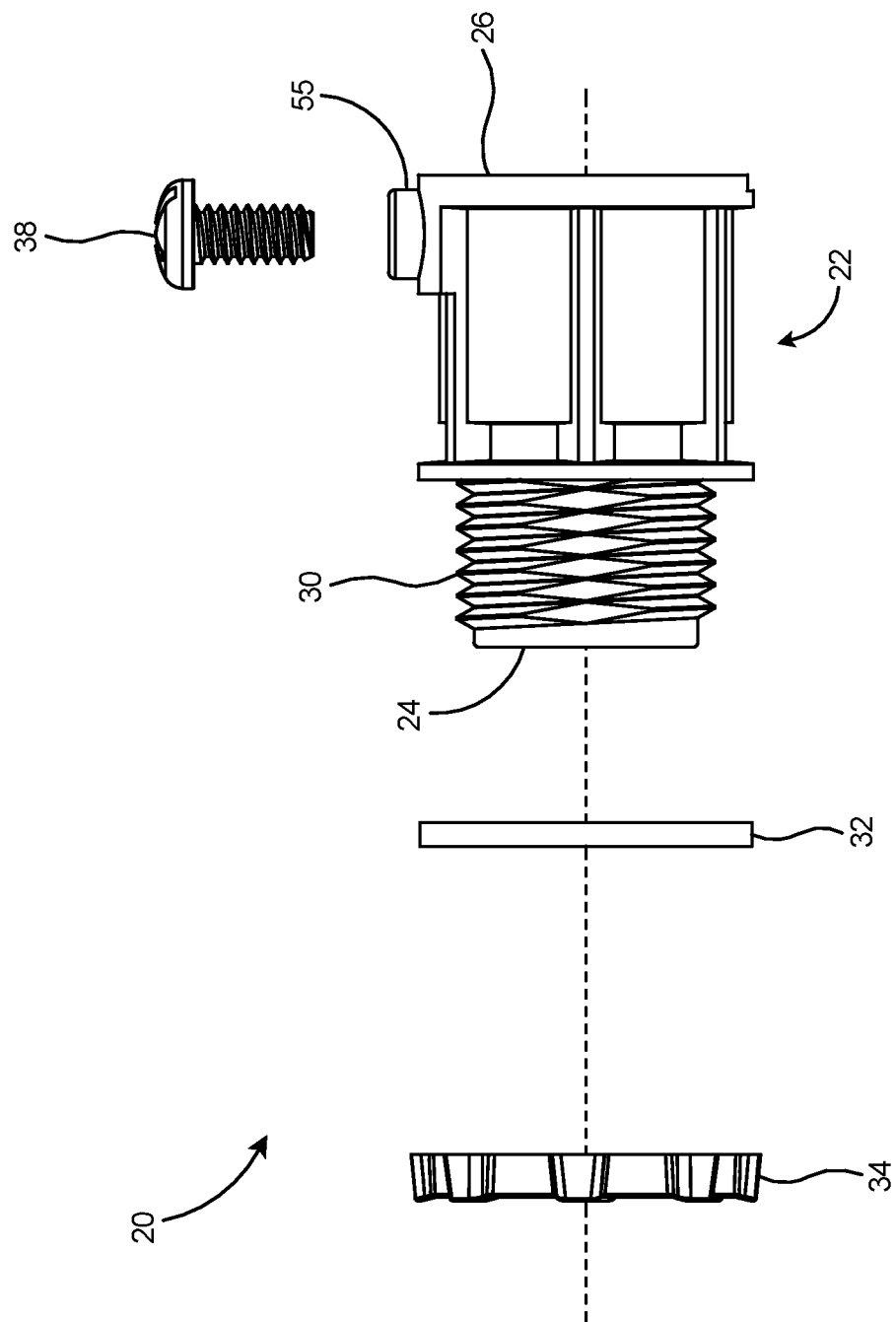
FIG. 11 is an exploded side view of the rain tight fitting according to the present invention.
Figure 12:
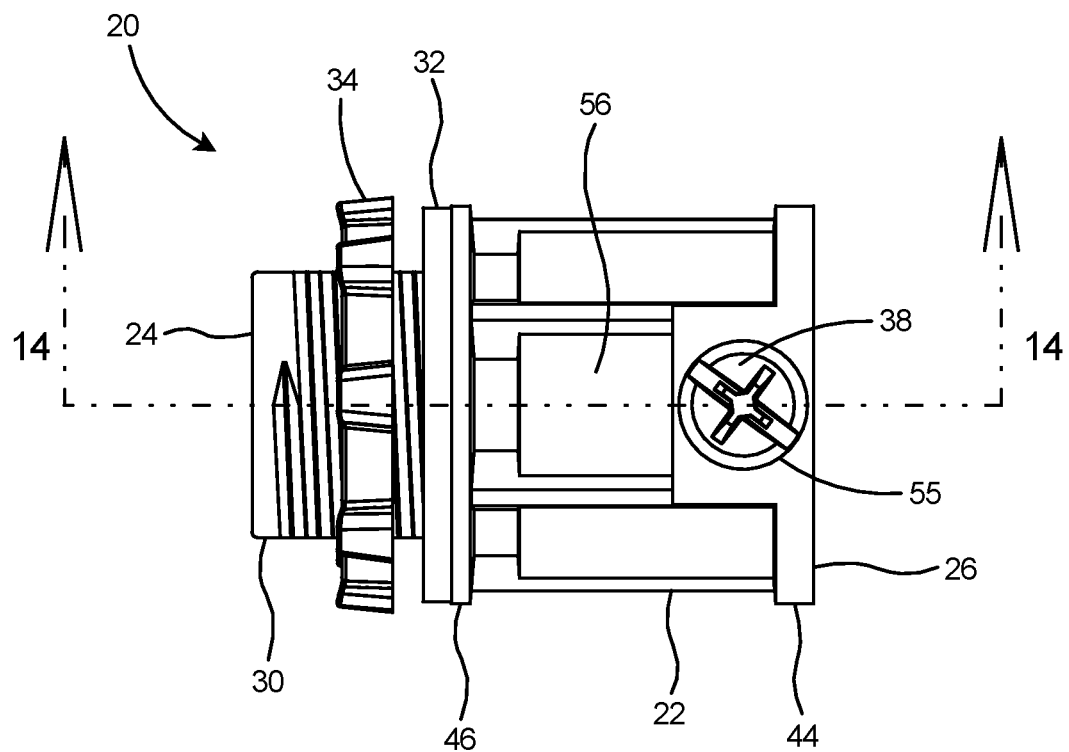
FIG. 12 is a top view of the rain tight fitting.
Figure 13:
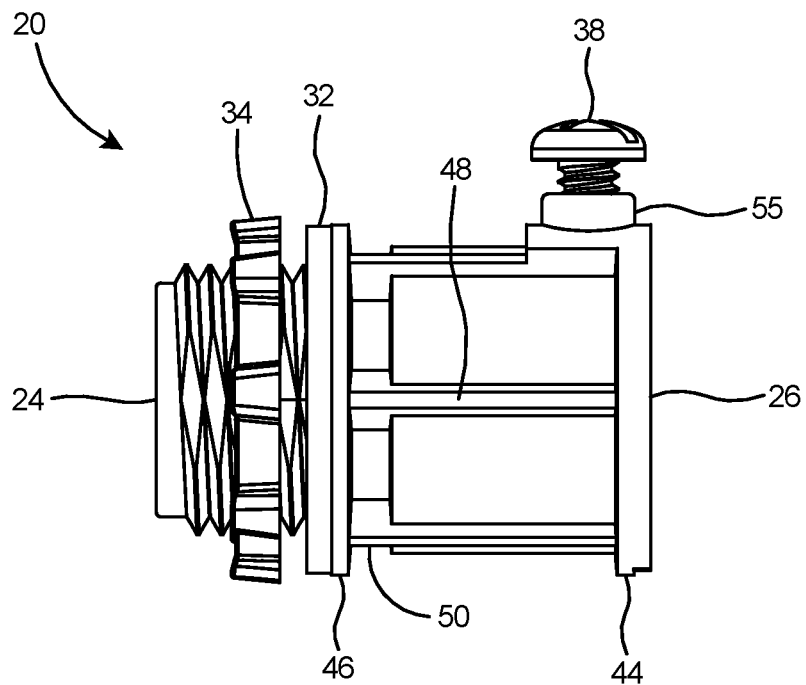
FIG. 13 is a side view of the rain tight fitting.

Referring to FIGS. 7-10, tubular sleeve 36 includes a leading end 66 and a trailing end 68. The trailing end 68 of sleeve includes a flange 70 at the trailing end 68 and an aperture 72 extending laterally through the sleeve 36 adjacent the flange 70. As shown in FIG. 9, sleeve 36 includes a main body portion 74 having a first inner diameter D1 and a leading body portion 76 that is turned inward toward the central axis 78. Sleeve 36 thus includes a necked-down wall 80 that is turned inward to a second inner diameter D2 at the leading end 66. Aperture 72 extends through the wall 83 of the sleeve. The flange 70 of the sleeve includes a notch 84 in longitudinal alignment along said sleeve with the aperture 72. As shown in FIG. 8, a bridge 85 extends over the notch 84. A tab 86 extends outward of the flange 70. Tab 86 is preferably located 180° opposite aperture 72 on flange 70. As shown in FIG. 9, flange 70 and tab 86 include a leading face 88. With reference to FIG. 11, the rain tight fitting 20 is an assembly of the fitting body 22, the washer 32, locknut 34 and the sleeve 36 (see FIG. 1).

Figure 14:
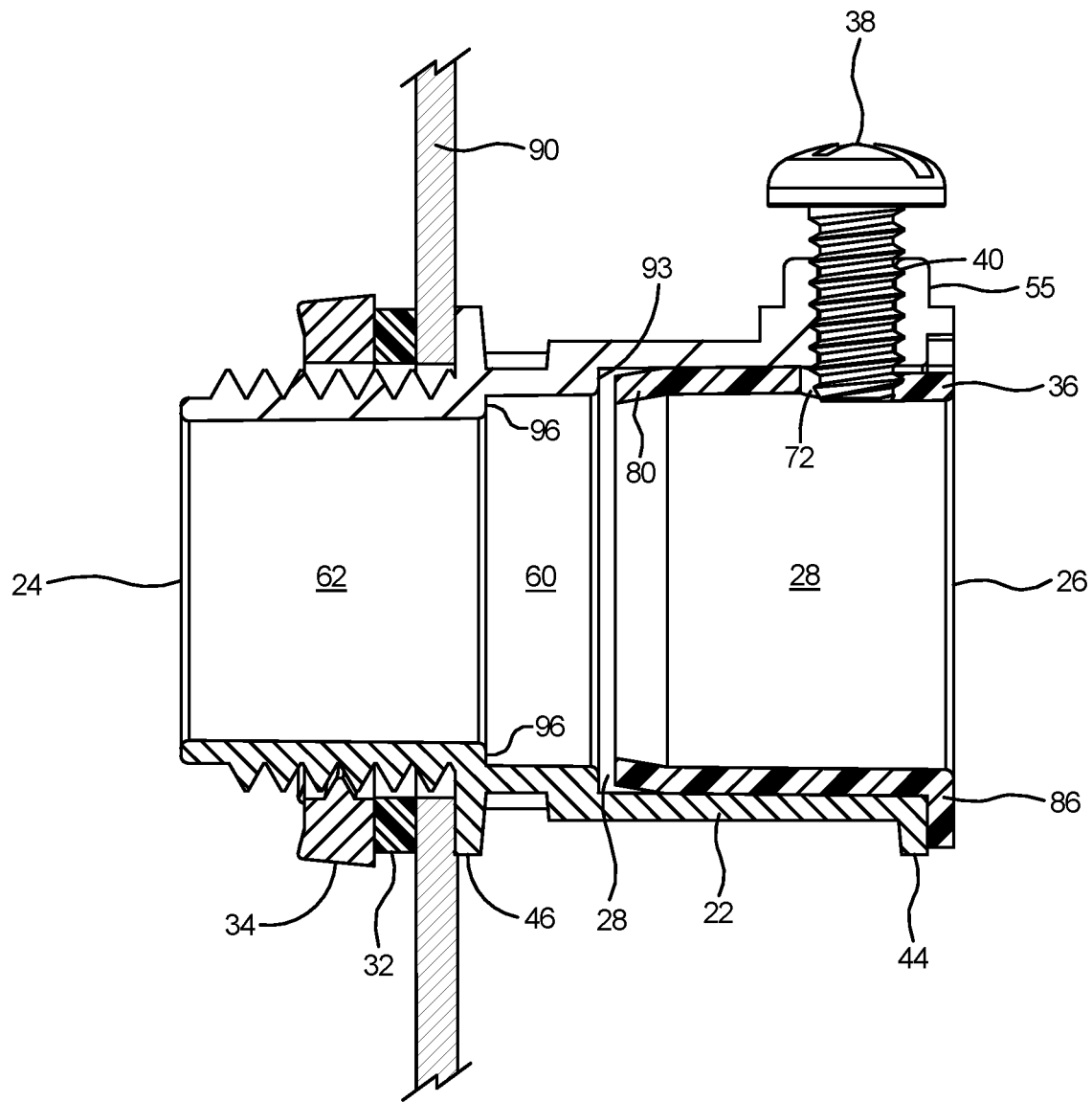
FIG. 14 is a sectional view of the rain tight fitting assembly taken along line 14-14 of FIG. 12 and connected to the wall of an electrical box.

Referring to FIG. 14, when tightened upon nose 30, washer 32 and locknut 34 function to create a rain tight fit of the leading end 24 against a panel or electrical box 90 and further function to electrically ground the fitting to the box or panel. Fitting body 22 includes an annular seat 93 at the leading end of trailing bore 28, the annular seat 93 functioning to abut and stop the travel of sleeve 36 as it is inserted within the trailing bore 28 at the trailing end 26 of the fitting body. Fitting body 22 further includes an annular tubing seat 96 for arresting the forward travel of the EMT or tubing as it is inserted within the sleeve 36 at the trailing end of the fitting.

Figure 17:
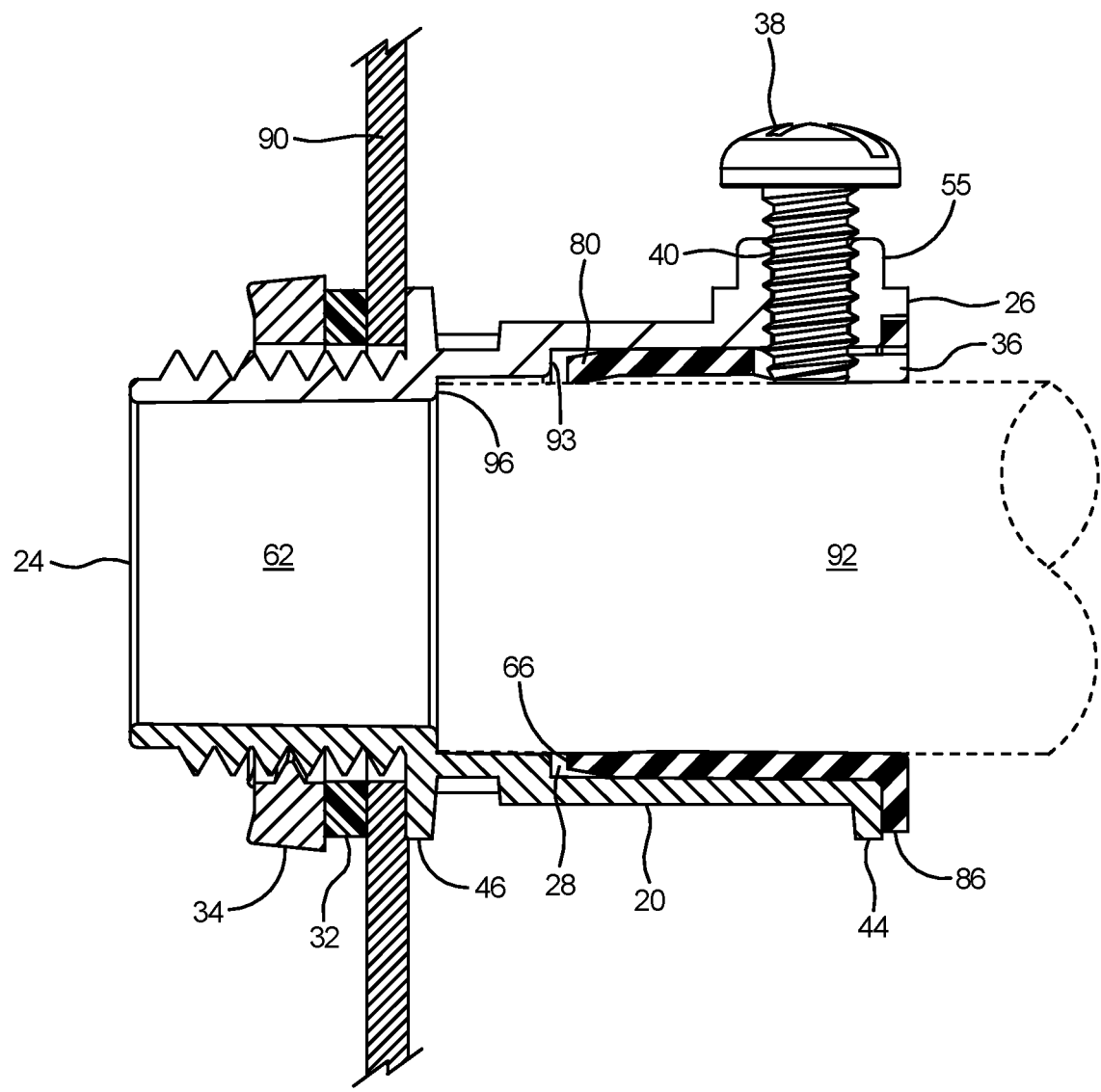
FIG. 17 is a sectional view of the rain tight fitting assembly taken along line 14-14 of FIG. 12 and connected to the wall of an electrical box and with electrical metal tubing connected to the trailing end.

As shown in FIG. 17, fastener 38, when tightened within bore 40 of fitting and through aperture 72 of sleeve 36, the fastener will make firm metal-to-metal contact with electrical metal tubing 92 that is inserted within the trailing bore 28 and will effectively ground the EMT 92 to the fitting 20. Further, the necked-down wall 80 of sleeve 36 will form a rain tight fit between the EMT and the fitting. At the leading end 24 of the fitting, the locknut 34 is tightened to compress the washer 32 against the electrical box to create a rain-tight fit of the fitting to the electrical box, with washer 32 in a rain-tight fit against the inner wall of the electrical box and mid-body flange 46 in a rain-tight fit against the outer wall of the electrical box 90.

Figure 15:
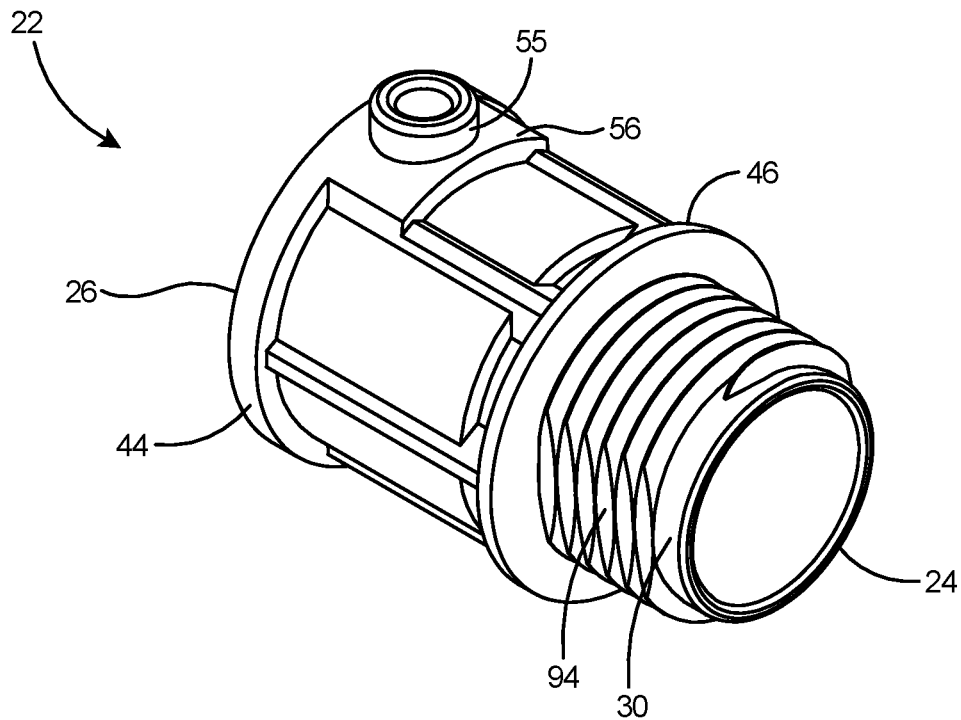
FIG. 15 is an isometric view, as viewed from the leading end, of the fitting body.
Figure 16:
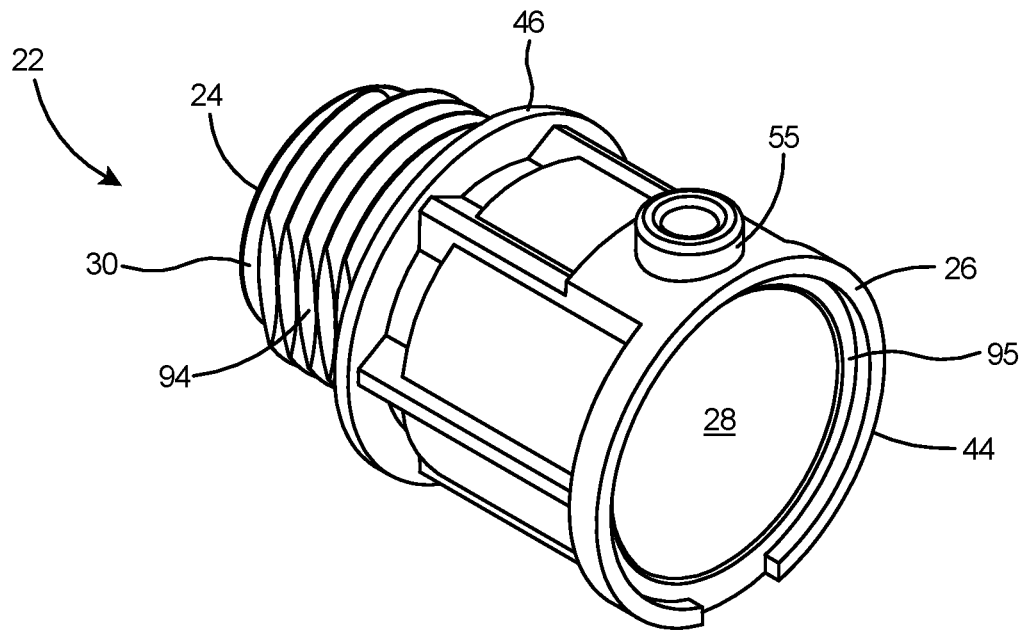
FIG. 16 is an isometric view, as viewed from the trailing end, of the fitting body.

Referring to FIGS. 15 and 16, nose portion 30 of fitting body 22 includes truncated threads 94 on opposing sides of the nose. The truncated threads 94 function to prevent flash when the fitting body 22 is die cast of metal. As shown in FIG. 16, the trailing end 26 of fitting body 22 includes an annular recessed area 95 within the end flange 44 for nesting of the flange 70 (see FIG. 8) of sleeve 36 when the sleeve is inserted within the trailing bore 28 of the fitting body 22.

Figure 18:
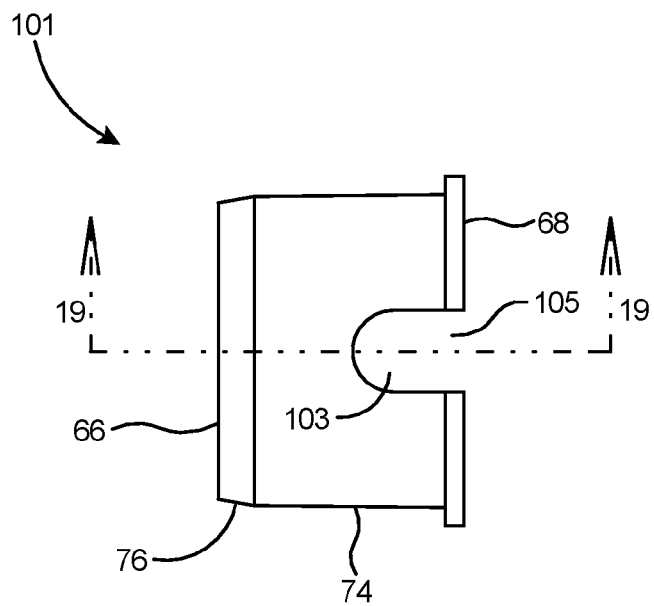
FIG. 18 is a side view of an alternate embodiment of the sleeve.
Figure 19:
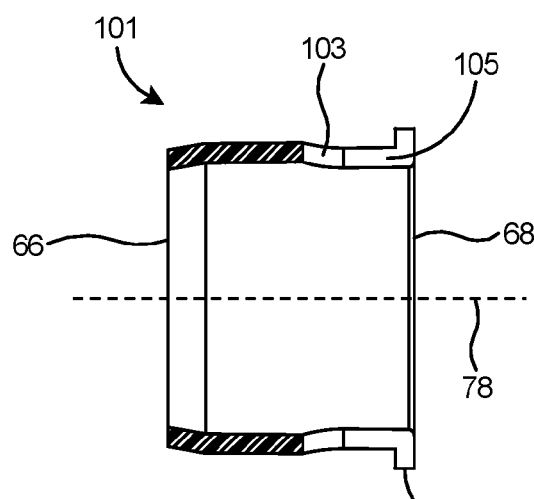
FIG. 19 is a sectional view of the sleeve taken along line 19-19 of FIG. 18.
Figure 20:
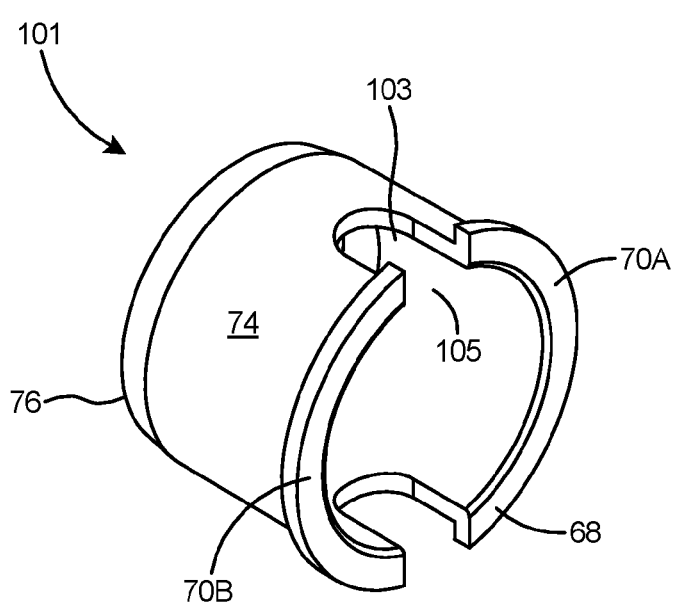
FIG. 20 is an isometric view of the alternate embodiment of the sleeve.

With reference to FIGS. 18-20, there is shown an alternate embodiment of the sleeve 101 according to the present invention. Similar to the first embodiment, sleeve 101 includes a leading end 66, a trailing end 68 with a flange 70, a central axis 78, a main body portion 74, and a leading body portion 76 that is turned inward toward the central axis 78. Sleeve 101 includes apertures 103 opposed at 180° across the trailing end 68 of the sleeve main body 74. The apertures 103 are slots that extend from the trailing end 68. Thus flange 70 includes a notch 105 in two places and flange is a discontinuous flange that includes, as shown in FIG. 20, a first flange portion 70A and a second flange portion 70B opposed at 180° across the trailing end 68 of the sleeve 101.

Figure 21:
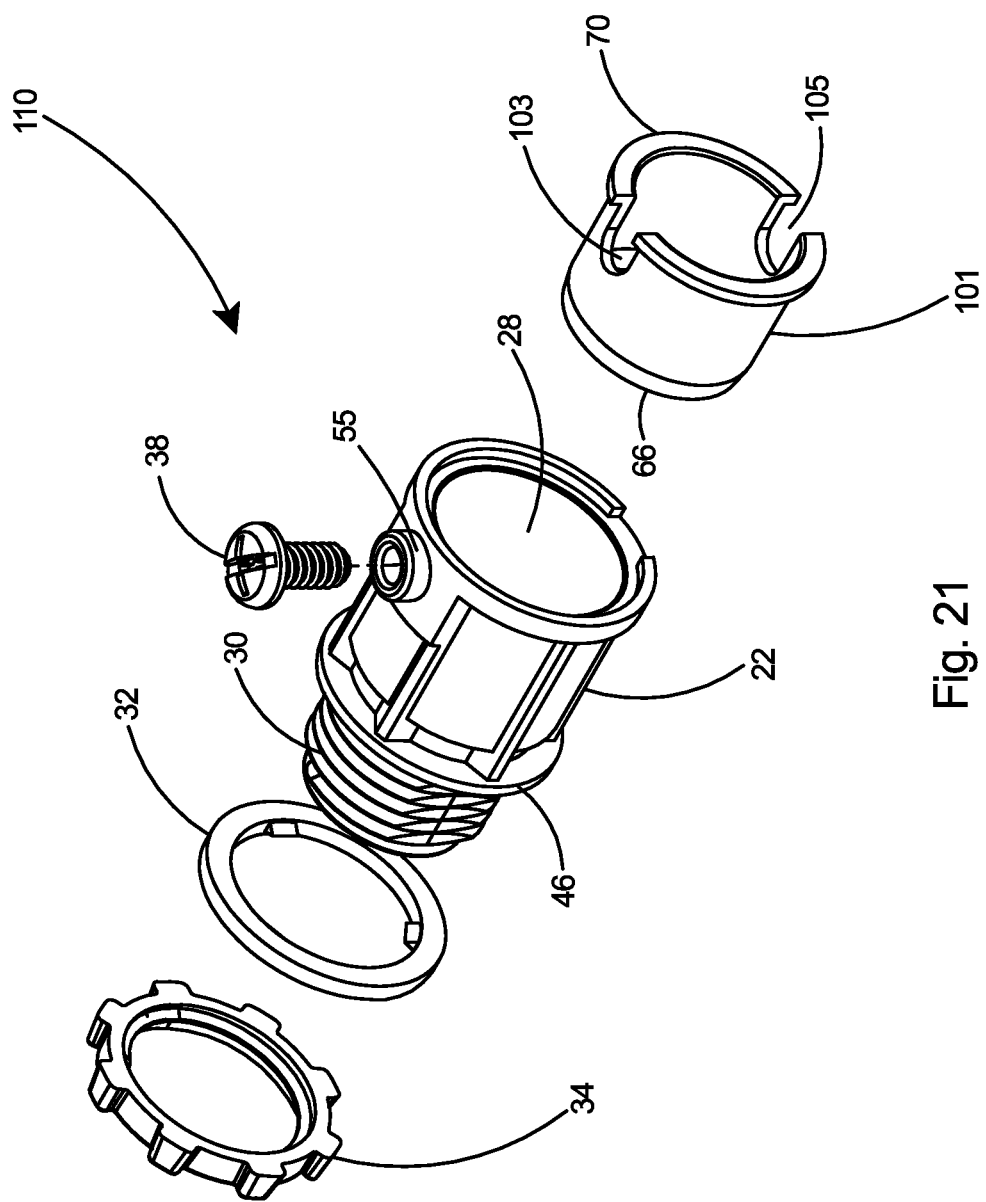
FIG. 21 is an exploded isometric view of a second embodiment of the rain tight fitting according to the present invention.

With reference to FIG. 21, the second embodiment of the rain tight fitting assembly 110 incorporates the sleeve of FIGS. 18-20 into the trailing bore of the connector body 22. Sleeve 101 can be rotated 180°, in either of two orientations with respect to the connector body 22, to align with screw 38 and thus provides for simpler assembly of the rain tight fitting.

Figure 22:
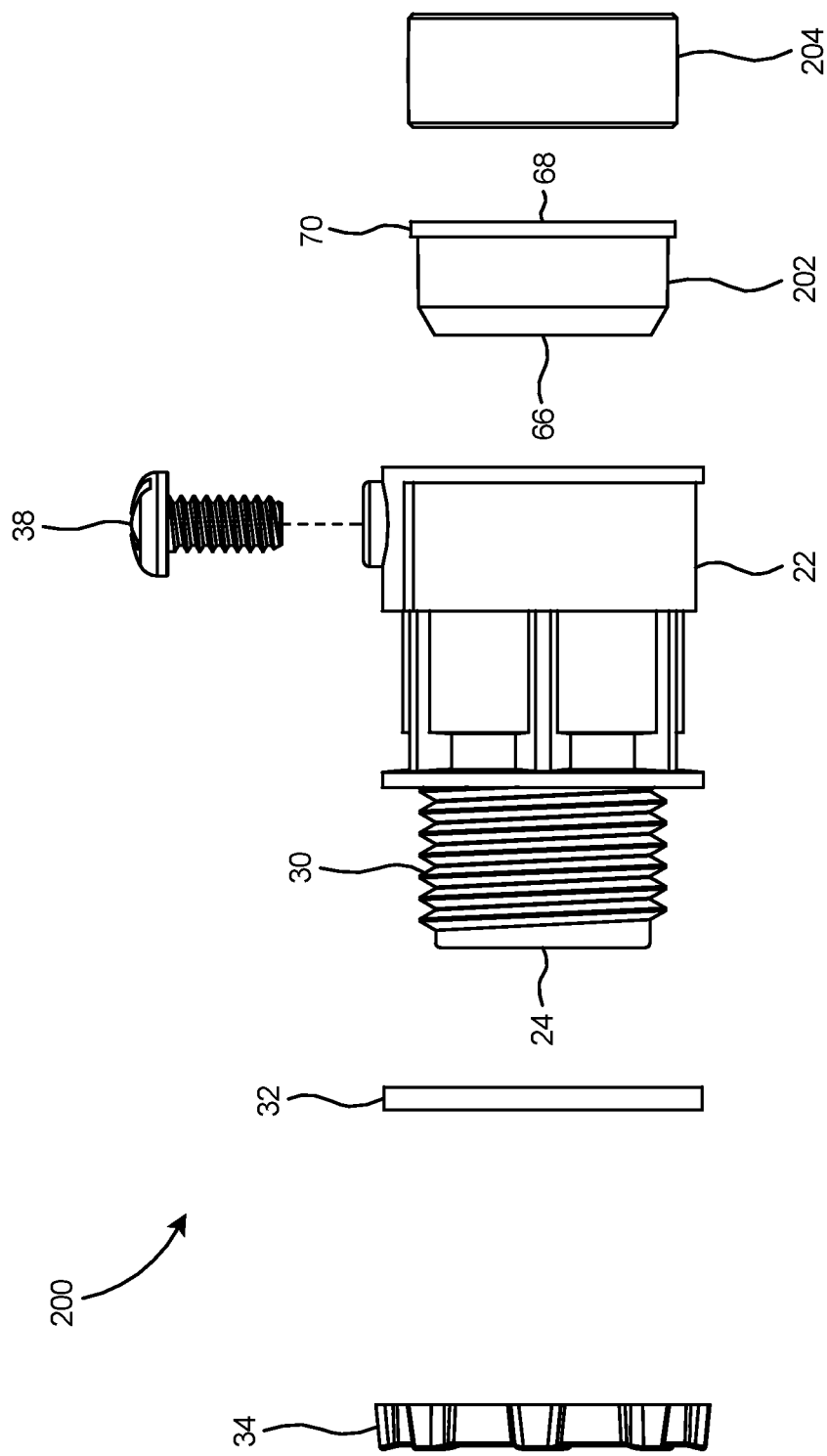
FIG. 22 is an exploded side view of a third and preferred embodiment of a rain tight fitting including an inner and outer sleeve for achieving a rain-tight fit of EMT to an electrical box.

Referring to FIG. 22, a third and preferred embodiment of the rain tight fitting 200 for connection of EMT to an electrical box includes the fitting body 22 with threaded nose portion 30 and a washer 32 and locknut 34 on the leading end 24 for connecting the leading end of the fitting to an electrical box (not shown). To provide an improved rain-tight fit and improved locking of an inserted EMT into the trailing end of the fitting 200, the third embodiment of the rain tight fitting 200 includes a tubular inner sleeve 202 to provide the rain-tight functionality and a tubular outer sleeve 204 to provide a more secure means of locking the EMT to the fitting. The inner sleeve 202 is preferably constructed of flexible material and is compressible. The compressible inner sleeve 202 is preferably constructed of plastic. Compressible inner sleeve 202 includes a leading end 66, a trailing end 68 and a flange 70 at the trailing end 68.

With reference to FIGS. 23-26, tubular outer sleeve 204 includes a sleeve body 206 having a leading end 208 and a trailing end 210. Both ends of the body 206 include a chamfer 212 on the inner and outer edges. An aperture 214 extends through the body 206 from the outer circumference 215 of the ring and is perpendicular to the axial center 216 of the sleeve body. The outer sleeve 204 is a rigid sleeve, preferably constructed of steel, zinc, or zinc alloy.

Referring to FIGS. 27-29, tubular inner sleeve 202 includes a sleeve body 218 having a leading end 220, a trailing end 222, and an end flange 224 on the trailing end. An outer nose 226 having a reduced diameter is included on the leading end 220. End flange 224 includes a front abutment surface 228. The inner wall 230 of the sleeve body 218 includes a leading body portion 232 that is of smaller diameter than the trailing inner portion 234. Leading body portion 232 gradually slopes inward from a mid-point 236 of the sleeve body 206 to the leading end 220.

Figure 30:
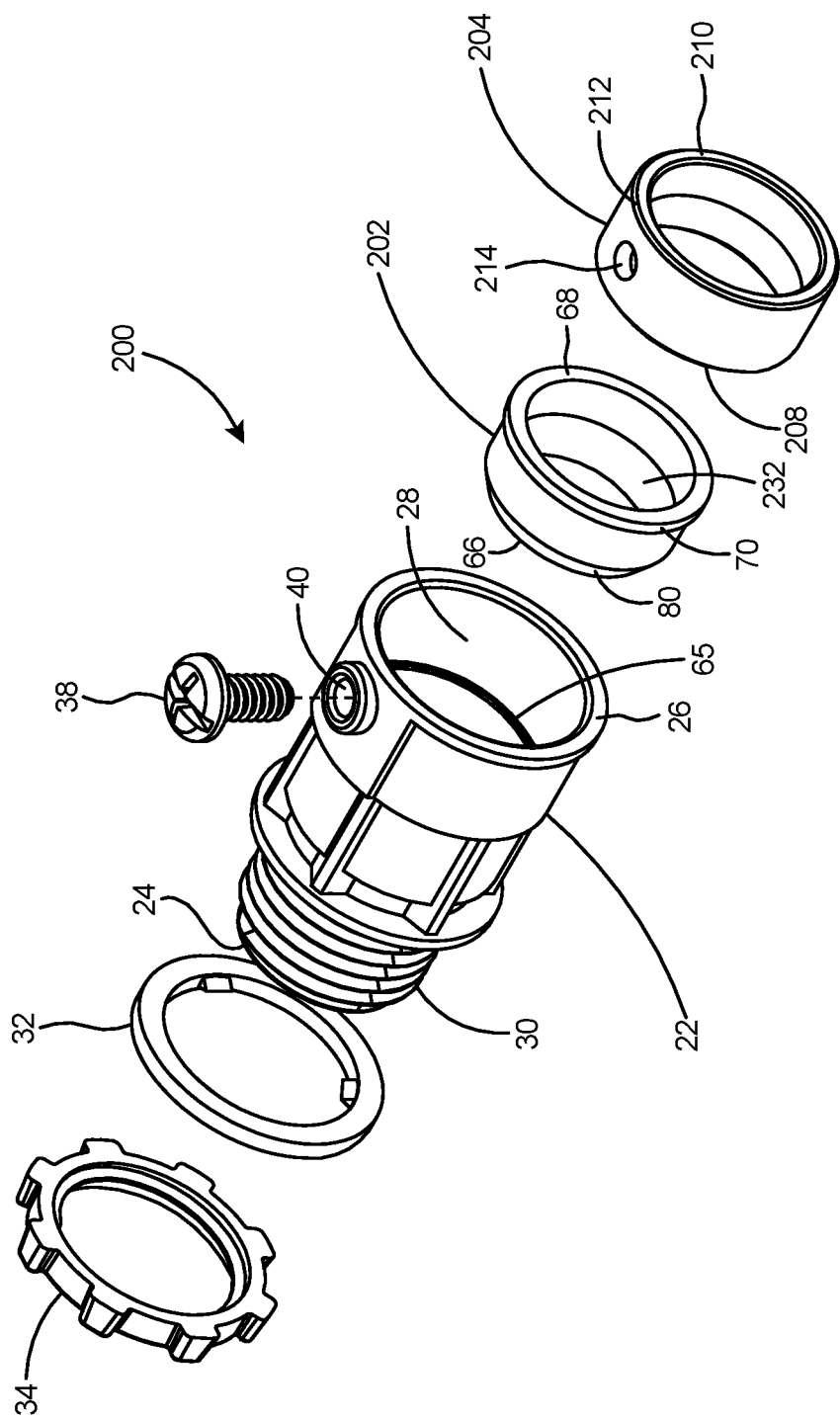
FIG. 30 is an exploded isometric view of the rain tight fitting of FIG. 22.

To operate the invention, as shown in FIG. 30, the leading end 24 of the rain tight fitting 200 may be connected to an electrical box using the washer 32 and locknut 34. At the trailing end 26 of the fitting, compressible inner sleeve 202 and rigid outer sleeve 204 may be loosely assembled with fitting body using screw 38. EMT may then be inserted within the trailing bore 28 of the fitting. The inserted end of the EMT is contacted by the gradually sloping leading body portion 232 of compressible sleeve 202 and forms a snug, rain-tight fit around the inserted end of the EMT. Screw 38 is then be tightened within threaded bore 40 of fitting 200 and through aperture 214 of rigid outer sleeve 204 until making firm contact with the EMT, securely locking the EMT to the trailing end of the fitting and effectively grounding the EMT to the fitting 200. The rigid outer sleeve 204 will bear against the compressible inner sleeve 202 and force the leading wall 80 of sleeve 202 against the abutment surface 65 of the fitting, thereby further forming a rain tight fit between the EMT and the fitting.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A rain-tight fitting for connecting electrical metal tubing to an electrical box, comprising:
    a fitting body including a wall, a leading end and a trailing end;
    a nose portion on said leading end of said fitting body;
    a mid-body flange on said fitting body;
    a fastener extending through said wall at said trailing end of said fitting body;
    a sleeve including a leading end and a trailing end;
    a flange on said trailing end of said sleeve;
    an aperture on said sleeve, said aperture extending laterally through said sleeve adjacent the flange;
    a tab extending outward of said flange on said sleeve;
    said tab is located 180° opposite said aperture on said sleeve;
    a notch on said sleeve;
    said notch in longitudinal alignment with said aperture on said sleeve; and
    a bridge on said sleeve, said bridge extending over the notch in said sleeve.

2. The rain-tight fitting of claim 1, further comprising:
    a trailing bore on said trailing end of said fitting body; and
    said sleeve adapted for insertion in said trailing bore.

3. The rain-tight fitting of claim 2, further comprising:
    a leading bore and a mid-body bore on said fitting body; and
    said trailing bore is of larger diameter than said mid-body bore.

4. The rain-tight fitting of claim 3, wherein said mid-body bore is of larger diameter than said leading bore.

5. The rain-tight fitting of claim 1, further comprising:
    a trailing flange on said fitting body; and
    an end flange on said fitting at said trailing end of said fitting body.

6. The rain-tight fitting of claim 5, further comprising:
    a rib extending longitudinally along the fitting body; and
    said rib extends substantially from said mid-body flange to said end flange.

7. The rain-tight fitting of claim 6, further comprising:
    a main body portion and a trough portion on said fitting body; and
    said trough portion of fitting body is narrower than said main body portion at said trailing end of said fitting body.

8. The rain-tight fitting of claim 7, further comprising:
    said rib of said fitting body including a wider rib section at said trough portion; and
    said rib of said fitting body including a narrower rib section at said trailing end of said fitting body.

9. The rain-tight fitting of claim 1, further comprising:
    threads on said nose portion; and
    a locknut and washer engaging said threads on said nose portion.

10. The rain-tight fitting of claim 1, further comprising:
    a raised area on said fitting body; and
    a boss extending from said raised area.

11. The rain-tight fitting of claim 1, further comprising an annular seat on said fitting body, said annular seat adapted to abut and stop the travel of said sleeve as it is inserted within said trailing bore of said fitting body.

12. The rain-tight fitting of claim 1, further comprising an annular tubing seat on said fitting body, said annular tubing seat adapted to arrest the forward travel of an electrical tubing as it is inserted within the sleeve at the trailing end of the fitting.

* * * * *